United States Patent [19]

Rumreich

[11] Patent Number: 5,822,011
[45] Date of Patent: Oct. 13, 1998

[54] APPARATUS FOR DETECTING NOISE IN A COLOR VIDEO SIGNAL

[75] Inventor: Mark Francis Rumreich, Indianapolis, Ind.

[73] Assignee: Thomson Consumer Electronics, Inc., Indianapolis, Ind.

[21] Appl. No.: 528,759

[22] Filed: Sep. 15, 1995

[51] Int. Cl.$^6$ .............................. H04N 9/45; H03L 7/00
[52] U.S. Cl. .......................... 348/549; 348/505; 348/624; 348/498
[58] Field of Search ........................... 348/612, 497–499, 348/505, 506, 508, 536, 537, 539, 549, 617, 624; 386/10, 19, 17, 18; H04N 5/44, 9/45

[56] References Cited

U.S. PATENT DOCUMENTS

| 4,376,952 | 3/1983 | Troiano | 358/166 |
| 4,384,306 | 5/1983 | Liu | 358/166 |
| 4,430,665 | 2/1984 | Cochran | 358/37 |
| 4,684,989 | 8/1987 | Roeder et al. | 358/167 |
| 4,860,090 | 8/1989 | Murata et al. | 348/604 |
| 4,989,073 | 1/1991 | Wagner | 348/498 |
| 5,353,066 | 10/1994 | Lee | 348/505 |
| 5,396,293 | 3/1995 | Shellard | 348/489 |

Primary Examiner—Michael Lee
Attorney, Agent, or Firm—Joseph S. Tripoli; Peter M. Emanuel; Robert D. Shedd

[57] ABSTRACT

A phase detector provides angular phase error measurements of the color burst component of a video input signal. Burst phase errors exceeding a given angular threshold are detected and the number occurring within a given period of time are counted. From the accumulated count, a noise indicating signal is derived and applied to a video picture processor for controlling a parameter of displayed images.

15 Claims, 6 Drawing Sheets

| OCTANT | BINARY | ANGLE |
|---|---|---|
| 0 | 000 | S/L |
| 1 | 001 | 90− S/L |
| 2 | 010 | 90+ S/L |
| 3 | 011 | 180−S/L |
| 4 | 100 | −(S/L) |
| 5 | 101 | −(90−S/L) |
| 6 | 110 | −(90+S/L) |
| 7 | 111 | −(180−S/L) |

FIG. 7

APPARATUS FOR DETECTING NOISE IN A COLOR VIDEO SIGNAL

FIELD OF THE INVENTION

This invention relates to electrical signal detectors generally and particularly to detectors for providing an indication of the noise content of color video signals.

BACKGROUND OF THE INVENTION

Video noise detectors are of general utility in video signal processing apparatus. For example, such detectors may be used to advantage in video systems of a type which are designed to vary functionally in accordance with the level of noise of the video signal being processed. Such noise controlled apparatus include, illustratively, those having noise responsive programmable bandwidth filters, noise responsive horizontal peaking circuits, noise responsive variable saturation chrominance processors and noise reducing recursive filters, to name a few of such uses.

Shellard, for example, in U.S. Pat. No. 5,396,293 entitled FILTER CIRCUIT WITH BANDWIDTH VARIED AS A FUNCTION OF BIT ERROR RATE AND LUMINANCE LEVEL, describes a digital video system in which the video bandwidth is controlled as a function of the bit error rate ("BER") of the digital video signal. Under noisy conditions, the BER increases and is used to effect a video bandwidth reduction. In a specific embodiment the bandwidth is controlled as a function of both the bit error rate and the luminance signal amplitude level.

Cochran, in U.S. Pat. No. 4,430,665 entitled AUTOMATIC VIDEO SIGNAL PEAKING AND COLOR CONTROL, describes a video system in which noise is detected and used to control two functions, namely, the video signal peaking and the chrominance signal level. Noise, in the Cochran apparatus, is estimated in one example by an analysis of "long term average" high frequency noise present in the video signal and is further estimated in another example with the aid of the receiver AGC circuitry. Responsive to the noise estimate, the luminance signal is controlled to exhibit significant de-peaking in the presence of weak, noisy received color television signals. Concurrently, the magnitude of the chrominance signal component is reduced to prevent a displayed color picture from appearing to exhibit over-saturated color.

Troiano, in U.S. Pat. No. 4,376,952 entitled NOISE RESPONSIVE AUTOMATIC PEAKING CONTROL APPARATUS, detects noise (for purposes of depeaking) by bandpass filtering the video signal and applying the filtered signal to a detector via a sampling circuit which is enabled only during blanking intervals so as to reject active video portions of the luminance signal. The detector is of the pulse averaging type wherein pulses representative of peaks of the sampled signal above a threshold level are generated and averaged to produce a smoothed control signal that is principally representative of noise and substantially independent of luminance signal transitions which occur during the sampling interval.

Liu, in U.S. Pat. No. 4,384,306 entitled VARIABLE PEAKING CONTROL CIRCUIT, describes a system in which the video signal is "de-peaked" under noisy conditions and in which noise detection is performed by comparing the signal levels of successive vertical picture points. In one example, the signal from three successive vertical lines are bought into temporal coincidence (by successively delaying the signal by 1-H and 2-H time periods), sampled and the samples are subjected to image analysis for the presence of impulse noise.

Roeder et al. in U.S. Pat. No. 4,684,989 entitled SIGNAL BACKGROUND NOISE DETECTOR, describes a system for estimating noise which includes circuitry for producing difference samples corresponding to signal differences between recurring redundant intervals of the signal. A number of such difference samples are averaged, and ones of the difference samples contributing to each average are subtracted from the averages. Magnitude values are extracted from differences between the averages and the difference samples and a predetermined number of the magnitude values are averaged to produce the noise estimate signal.

SUMMARY OF THE INVENTION

The present invention is directed, in a first respect, to meeting the need for a noise detector which avoids the complexities of image analysis and provides a robust and reliable indication of noise.

Apparatus for detecting noise, in accordance with the invention, comprises means for deriving a burst component from an input video signal; means for measuring a phase angle of the burst component relative to a phase reference signal supplied thereto; and means for deriving a noise indicating signal from the phase angle measurements.

A desirable application of the principles of the invention includes a source for providing an input signal having a periodic component and a variable oscillator for generating an oscillatory signal. Means are provided for sampling the input signal at instants determined by the oscillatory signal for providing samples of the periodic component of the input signal. An arithmetic processor, responsive to the samples, generates an angular phase error signal for phase locking the oscillatory signal of the variable oscillator to the periodic component of the input signal and from the angular phase error signal a noise indicating signal is derived.

BRIEF DESCRIPTION OF THE DRAWING

The invention is illustrated in the accompanying drawing, wherein like elements are denoted by like reference designators and in which.

DETAILED DESCRIPTION

Figure 1:
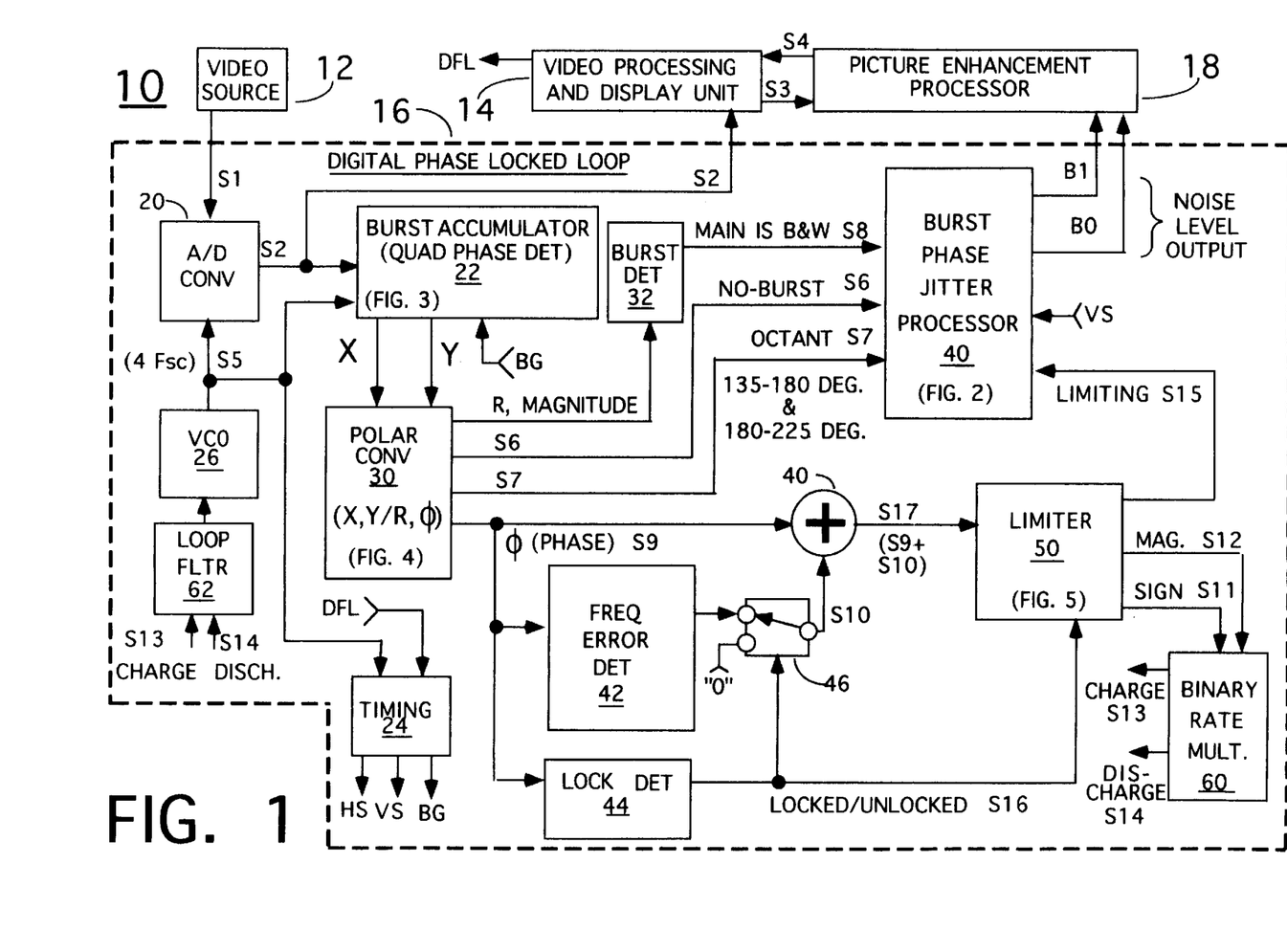
FIG. 1 is a block diagram of a television apparatus embodying the invention.

FIG. 1 illustrates television apparatus 10 embodying the invention which includes a video source 12 for providing a video signal S1 and a video signal processing and display unit 14 for displaying the video signal. For television receiver applications the source 12 may include a conventional tuner, IF amplifier and detector. Additionally, source 12 may include one or more baseband video inputs and suitable switching for selecting from plural video input signals. For television monitor applications the tuner may be omitted. The processing and display unit 14 may be of conventional design including, for example, luma and chroma processing circuits, a display (e.g., a kinescope or LCD device) and suitable display driver circuits. To simplify the drawing, details of sound and color processing are omitted.

The baseband video signal S1 provided by source 12 is converted to a digital signal S2 for application to the video processing and display unit 14 by means of an analog to digital (A/D) converter 20 in a digital phase locked loop 16 (outlined in phantom) embodying the invention. The noise indicating signal (B0, B1) is applied to a control input of a picture enhancement processor 18 which is coupled to receive a video signal S3 from the display processor 14 and to supply an enhanced video signal S4 back to the display processor for display.

The purpose of processor 18 is to enhance one or more parameters of the displayed image and vary the enhancement as a function of the noise level as indicated by the two-bit noise indicating signal (B0, B1). To this end the enhancement processor 18 may be of conventional design such as the systems previously described. Recall that the system of Shellard provides a desirable reduction in video bandwidth as the noise level increases. The systems of Liu and of Troiano apply "depeaking" under poor signal to noise ratio conditions and that of Cochran utilizes the noise signal to control both video peaking and the chrominance signal level. Another useful application of the noise signal would be for controlling the degree of noise reduction applied to video signals. It is apparent that many other suitable applications exist for the noise level indicating signal (B0, B1) of the present invention.

Digital phase locked loop 16 comprises the analog to digital (A/D) converter 20 to which the video signal S1 is applied and which supplies the converted (digital) video signal S2 to the processing and display unit 14 as previously mentioned. A phase locked sampling clock signal S5 of four times the color subcarrier frequency (4Fsc) is provided to D/A converter 20, to a burst accumulator (or "quadrature phase detector") 22 and to a timing unit 24 by a voltage controlled oscillator 26. The timing unit 24 is synchronized with the "master clock" (S5) signal provided by VCO 26 and with deflection timing signals DFL from the video processing and display unit 14 for generating a number of timing signals for the phase locked loop 16 including horizontal synchronizing (HS), vertical synchronizing (VS) and burst gating (BG) signals.

Figure 2:
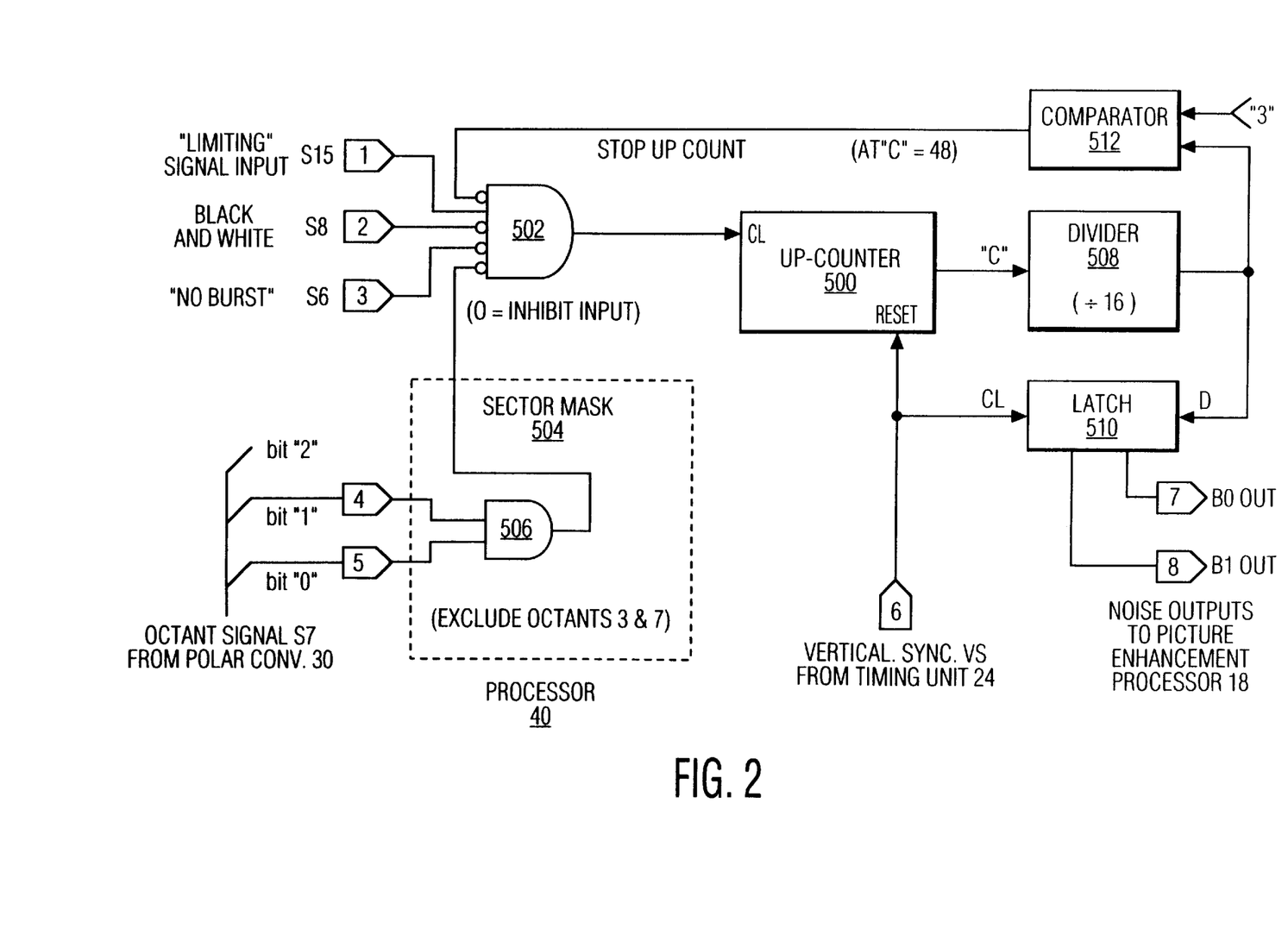
FIG. 2 is a detailed block diagram of an inhibitable counter suitable for use in the example of FIG. 1.

The burst gating signal BG, the 4Fsc clock signal and the sampled video signal S2 are applied to the burst accumulator 22 which sorts and totalizes the even and odd samples of signal S2 occurring during the burst interval into two groups of samples. This includes an in-phase group of samples X (which occur at the burst peaks) and a quadrature phase group of samples Y (which occur at the burst zero crossings). The numbers X and Y represent the burst vector coordinates in a Cartesian (rectangular) coordinate system. An exemplary accumulator is shown in FIG. 2 and described later.

Figure 3:
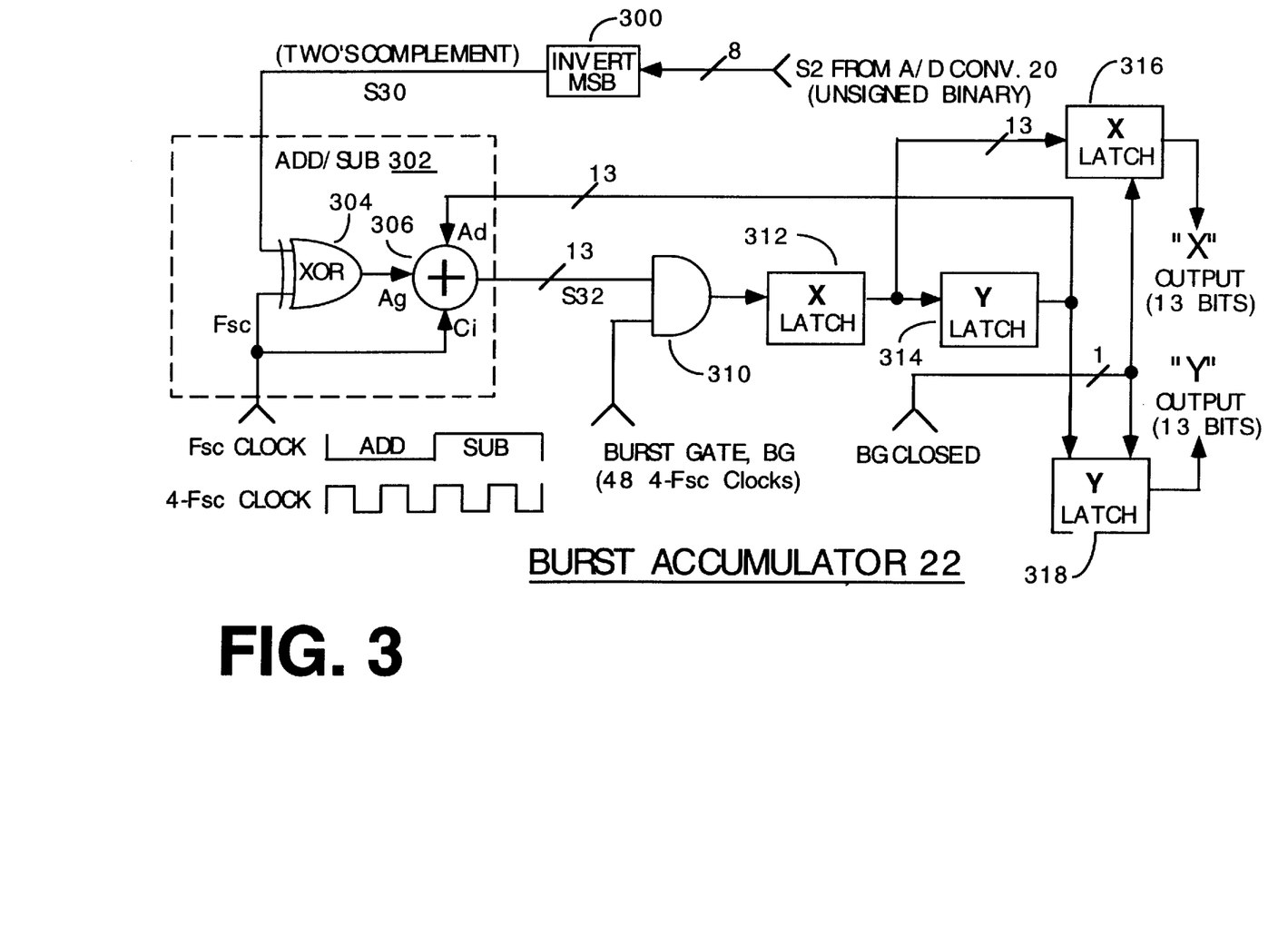
FIG. 3 is a detailed block diagram of a burst sample accumulator suitable for use in the apparatus of FIG. 1.

The X and Y coordinates of the burst vector are next applied to a rectangular to polar coordinate converter 30 which converts the XY coordinates from rectangular to polar coordinate form (R,φ) having a magnitude term R and a phase angle term φ. A direct approach to providing this conversion would be to apply the X and Y values to the address inputs of a read only memory (ROM) programmed with the corresponding radius and angle values. Such an arrangement, however, would require a relatively large memory. A better approach, which eliminates the need for a large memory, would be to calculate the angles using sine, cosine or tangent trigonometric approximations. FIG. 3 is exemplary of such a coordinate system converter (rectangular to polar) and is discussed in detail later.

The magnitude term R provided by polar converter 30 is applied to a burst detector 32 which outputs a signal S8 denoted "BLACK & WHITE" to an input of a burst phase jitter processor 40 when the video signal S1 includes no burst component thus indicating a black and white (monochrome) picture.

Two further signals generated by polar converter 30 are a NO-BURST signal S6 and an OCTANT signal S7, both of which are applied to respective inputs of the jitter processor 40. The "NO-BURST" signal is generated by a second burst detector which is located in the polar converter (and shown in FIG. 4) and detects the absence of individual bursts of the video signal S2. This information is needed by the jitter processor to inhibit processing during selected lines of a color video signal. For example, burst is not present during certain lines of the vertical interval (e.g., lines 1–9 when vertical sync is present). Individual bursts may be missing also in a color video signal during active video intervals due, for example, to loss of signal from noise, magnetic tape drop-outs or the like.

In brief summary, there is a special need for two burst detectors in the noise detection system of the present invention. One of these detectors (32 in FIG. 1) is provided with a relatively long time constant or response speed (e.g., one field or more) for identifying black and white (monochrome) having no burst component at all. This detector inhibits the noise detection system for all monochrome video input signals. The other burst detector (432, 436 in FIG. 4) is provided with a relatively short time constant or response speed (e.g., one line time) for identifying missing bursts on a line by line basis. For the particular fast burst detector shown in FIG. 4 (and discussed later) a comparator 432 makes an essentially instantaneous determination if the magnitude of the burst vector (signal L, the larger of the X and Y coordinates) is above or below a threshold value set by a "No Burst" threshold source 436. In a color video signal some bursts are always missing, such as during lines 1–9 of the vertical interval, and some are occasionally missing, due to noise or tape dropouts. To achieve an accurate estimate of noise in a color video signal, the missing bursts are detected and used to provide a modification of operation of the jitter processor 40.

Figure 6:
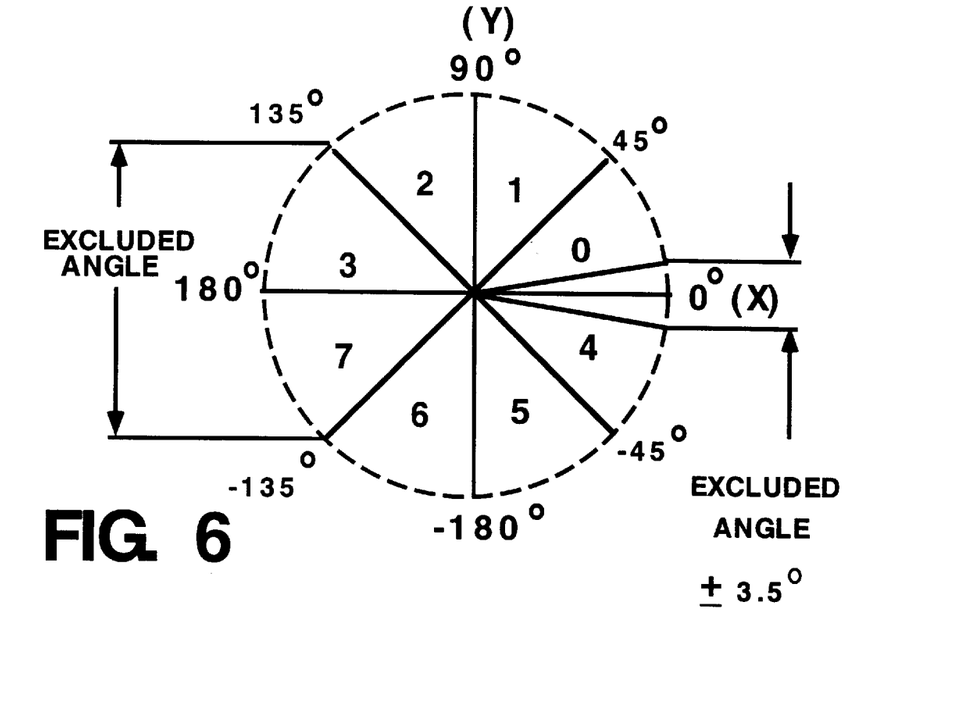
FIG. 6 is a phasor diagram illustrating certain aspects of operation of the example of FIG. 1.

As noted above, the polar converter 30 also outputs a signal called "OCTANT" to the jitter processor 40. This signal identifies which one of eight forty-five degree octants the burst vector angle occupies relative to the reference phase of the VCO 26. FIG. 6 illustrates the octants and the table of FIG. 7 lists the three-bit binary code identifying each 45 degree octant. As to the phase locked loop, the octant information is used in making an arctangent approximation to the burst angle as will be explained. The octant information, in the present invention, also serves an additional purpose unrelated to the angle calculation. Specifically, the octant information in the present invention also serves to inhibit processing of certain phase angles from the noise calculation.

As an example, the "OCTANT" (S7) signal inhibits processing in the jitter processor 40 for burst angles in the 45 degree octant from 135 degrees to 180 degrees and in the 45 degree octant from −135 degrees to 180 degrees (Octants 3 and 7, respectively). This prevents erroneous measurements of video noise being made in the presence of certain anti-copy coded video signals. An anti-copy coded video signal is one in which portions of the video signal are intentionally altered in a way that makes video taping of the signal difficult. One such "anti-copy" system reverses the burst phasing for four of every twenty video lines. The advantage of this feature of the invention is that by inhibiting processing of the burst phase noise signal in the two octants adjacent to 180 degrees, the anti-copy coded burst signal is prevented from interfering with the burst jitter measurement of video noise.

The phase angle signal $\phi$ (signal S9), produced by polar converter 30, is used for two purposes in the present invention, namely, (i) for detection of noise in the video signal S1 and (ii) for phase locking VCO 26 to the burst component of the video signal S1. Specifically, phase signal $\phi$ provided by converter 30 is applied to an adder 40, to a frequency error detector 42 and to a lock detector 44. The output of the lock detector 44 is applied to a switch 46 that couples the frequency error output of detector 42 to another input of adder 40 when the lock detector indicates that the system is not locked. The frequency error detector 42 measures the rate of change of the phase signal $\phi$ from line to line and is, essentially, a differentiator and may be implemented by storing the phase of a previous line in a latch and subtracting the current and previous phase values to obtain the derivative with respect to time.

Since the derivative of phase with respect to time equals frequency, the output of the frequency error detector is proportional to the frequency error when the system is not locked. In this out-of-lock condition the lock detector 44 enables switch 46 to add the frequency error signal S10 to the phase angle signal S9 in adder 40. This "augmentation" of the phase angle signal when the loop is out of lock has been found to desirably enhance the speed of phase locking. Once locked however, lock detector 44 opens switch 46 removing the frequency error signal S10 from adder 40 and thereafter phase control is solely by means of the phase angle signal S9.

The output of adder 40, as noted above, comprises the burst phase angle signal S9 when the system is locked (switch 46 open) and comprises the sum of S9 and the frequency error signal S10 when the system is out of lock. The adder output signal S17 is applied to a limiter circuit 50 that which provides limiting and separates the limited phase angle signal into its sign S11 (positive or negative) and its magnitude S12 (the unsigned angle) and these signals S11 and S12, respectively, are applied to a binary rate multiplier 60.

The purpose of the binary rate multiplier 60 is to generate pulses of current for charging and discharging a capacitor in the loop filter 62 connected to the multiplier 60 to thereby control the frequency of oscillation of VCO 26. The number or rate of production of current pulses is proportional to the magnitude of the phase angle signal $\phi$. For example, when the sign signal S11 is positive, binary rate multiplier 60 generates positive current pulses (signal S13) for charging the loop capacitor and increasing the VCO frequency. Conversely, when the sign signal S11 is negative, multiplier 60 generates negative current pulses (signal S14) for discharging the loop capacitor and decreasing the VCO frequency. At lock the magnitude of the phase angle $\phi$ approaches zero and only enough pulses are produced to maintain a locked condition.

Figure 5:
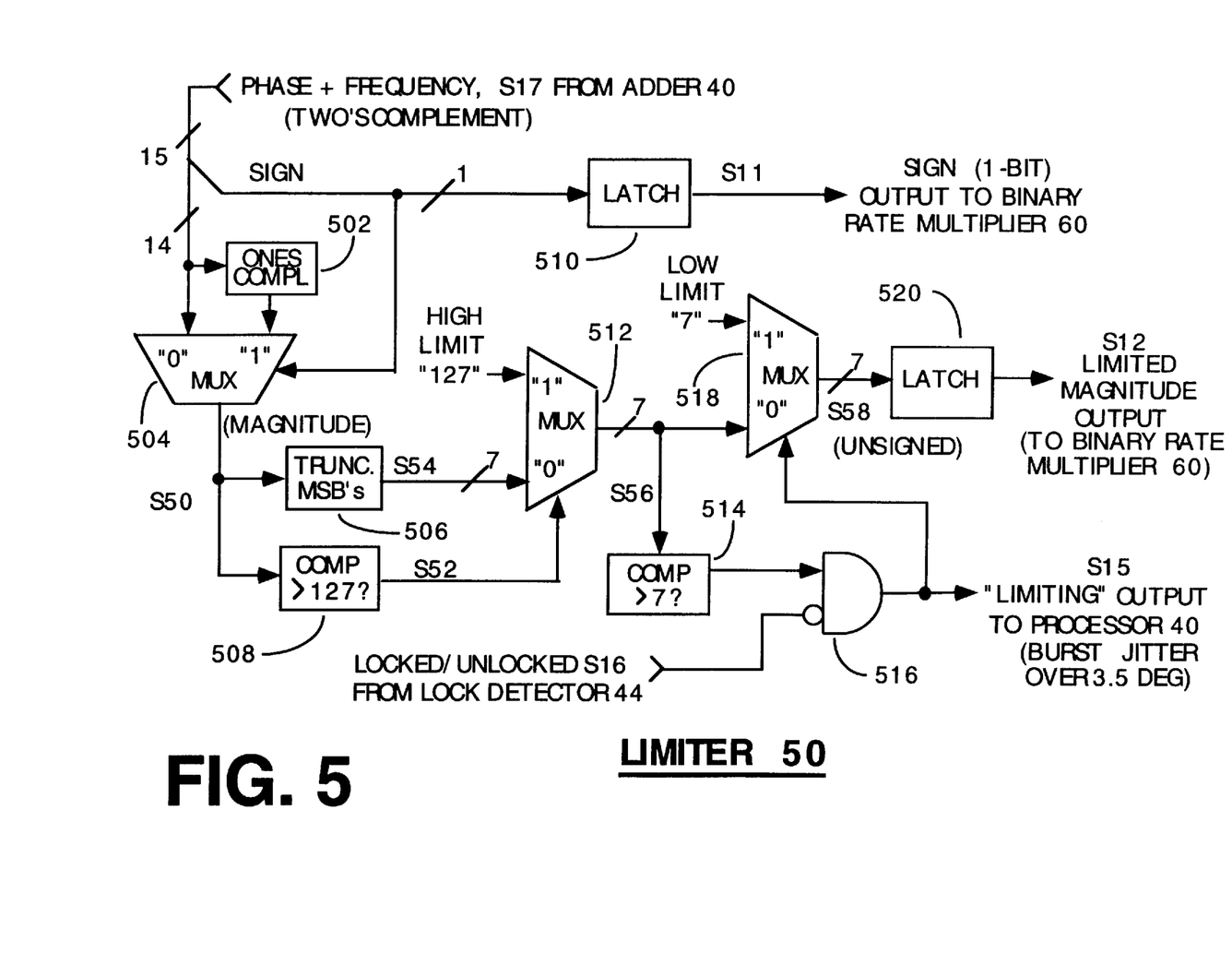
FIG. 5 is a detailed block diagram of a limiter suitable for use in the apparatus of FIG. 1.

The reason for limiting the phase angle signal $\phi$ in limiter 50 is to prevent large phase or frequency errors from overly influencing the loop operation. A further function provided by limiter 50 is to provide an indicator signal ("LIMITING") S15 to the jitter processor 40 that indicates when the limiter 50 is in a limiting condition. The "limiting" signal thus signifies that the system is locked and that the burst phase angle is greater than a predetermined minimum or limiting value. Under these conditions the magnitude signal S12 is limited thereby limiting the maximum charge or discharge currents for the loop filter 62. An exemplary "limiting" value when the system is locked is a phase angle of about 3.5 degrees. When out of lock, the limiting level is increased (by a factor of ten or more) to enhance the speed of re-acquiring lock. A suitable implementation of limiter 50 is shown in FIG. 5 and discussed later.

The "limiting" signal S15 provided by limiter 50 is applied to the burst phase jitter processor 40. The combination of limiter 50 and processor 40, in accordance with an aspect of the invention, provides the function of deriving the noise indicating signal B0,B1 from the phase angle measurements provided by the polar converter 30.

In more detail, recall that limiter 50 detects burst phase errors that exceed a relatively small angle (e.g., 3.5 degrees) when the system is locked. The burst phase jitter processor provides the function of counting the number of lines in a given time interval (e.g., a field or frame) for which the phase angle measurement ($\phi$) exceeds the threshold angle of detection (3.5 degrees). From the count, the jitter processor 40 generates and outputs the count or a scaled version of it as the noise indicating signal. In this example, the count of burst phase excursions that exceed the threshold phase angle value and which occur within one field is scaled down to provide a two bit output signal (bits B0 and B1) which provide four discrete levels of noise indication (e.g., 00, 01, 10 and 11 in binary). The noise indicating signal is then applied to picture enhancement processor 18 for adjusting parameters of images displayed by unit 14 such as the contrast, sharpness, bandwidth or noise reduction as previously discussed.

FIG. 2 is a detailed block diagram of a suitable implementation of processor 40. Essentially, the processor 40 comprises a non-wrapping inhibitable field-rate up-counter the output of which is scaled down to the two most significant bits (MSBs) to form the noise indicating signal B0, B1.

Processor 40 includes six inputs and two outputs. Inputs 1, 2 and 3 receive, respectively the "limiting" signal S15, the "black and white" signal S8 and the "no burst" signal S6. Inputs 4 and 5 receive, respectively, the two least significant bits "1" and "0" of the octant indicating signal S7 and input 6 receives a vertical timing signal VS from the timing unit 24. The two outputs 7 and 8 provide the two bits B0 and B1 of the noise reduction signal to the picture enhancement processor 18.

Processor 40 is implemented, illustratively, by an up-counter 500 the output of which is divided by 16 in a divider 508 and applied to an output latch 510 that provides the noise indicating output signal bits B0 and B1. The up-counter 500 is clocked by the limiting signal S15 via inhibitable AND gate 502. Each time the limiter 50 indicates a phase angle greater than the minimum value (e.g., 3.5 degrees when locked) the counter 500 is advanced. The counter 500 is reset once each field by means of the vertical sync signal VS which also latches the counter output in latch 510.

The output of counter 500 has been "scaled down" or divided by 16 in divider 508 to provide a more condensed presentation of the noise information. For example, a binary output value of "00" signifies that limiting has taken place less than 16 times during one field. An output of "01" signifies that limiting occurred at least 16 times but less than 32 times during one field. An output of "10" indicates that limiting has occurred at least 32 times but less than 48 times. Finally, an output of "11" signifies that limiting has taken place at least 48 times during a field.

Advantageously, it has been found that scaling the count down to provide the above four indications of the number of times the burst angle (or "jitter") has exceeded the acceptable minimum phase error (e.g., about 3.5 degrees) provides a useful number of noise level indications. If finer resolution is desired one may divide the output of counter 500 by a number smaller than 16. Maximum resolution may be obtained by taking the count "C" of the counter directly as the noise indicating signal.

In order to prevent the counter from "wrapping" or "overflowing" in cases where a large number of burst errors are made, the divided count is compared by a comparator 512 with a numerical value of "3" (binary "11"). This signifies that a count of 48 has been achieved in one field and the comparator output, being applied to an inhibit input (signified by an open circle) of AND gate 502, prevents further counting during the field.

The foregoing is an advantageous feature of the invention because it prevents "false low" indications of noise. For example, suppose that a very noisy video signal clocks counter 500 beyond its modulo. The counter output then, at the end of a field, might be any number. If that number is less than 16 then the noise signal will equal "00" signifying a relatively noise free condition when, in fact, just the opposite is true. Accordingly, comparator 512 prevents "wrapping" of counter 500 and so ensures that counter 500 can not count beyond a value of "48" no matter how many limit indications are provided by the limiter 50.

The foregoing discussion of the "non-wrapping" or overflow protection features of counter 500 illustrates one of four inhibiting conditions for the counter. The three other "inhibiting" conditions for counter 500 are (i) BLACK AND WHITE, (ii) NO BURST and (iii) SECTOR MASKING. Recall that monochrome video signals lack burst and so to avoid erroneous noise estimates the output of long time constant (field interval) burst detector (signal S8) which signifies that the video signal is monochrome is applied (at terminal 2) to a second inhibit input of AND gate 502. (Inhibit inputs are signified in the drawing by open circles at the gate inputs). The NO BURST signal S6 provided by a short time constant burst detector is also applied at input terminal 3 to another inhibit input of AND gate 502 to prevent counting during the vertical sync interval (when burst is absent) and to prevent counting otherwise defective bursts (e.g., burst missing due to tape oxide dropouts, etc.) with otherwise could yield an inaccurate count.

The last inhibiting condition of the counter 500 is applied for burst angles within a sector extending 45 degrees on either side of 180 degrees which corresponds to octants 3 and 7 (shown in FIG. 6) of burst phase angle. This is referred to in the drawing as "sector masking" and its purpose, as previously explained, is to exclude all bursts from being counted which are likely to be intentionally reversed in phase by anticopying video coding techniques. As previously noted, one such technique reverses burst phase for 4 of each 20 video lines. Advantageously, excluding the reverse phased lines from the measurement preserves the integrity of the noise estimate.

Figure 7:
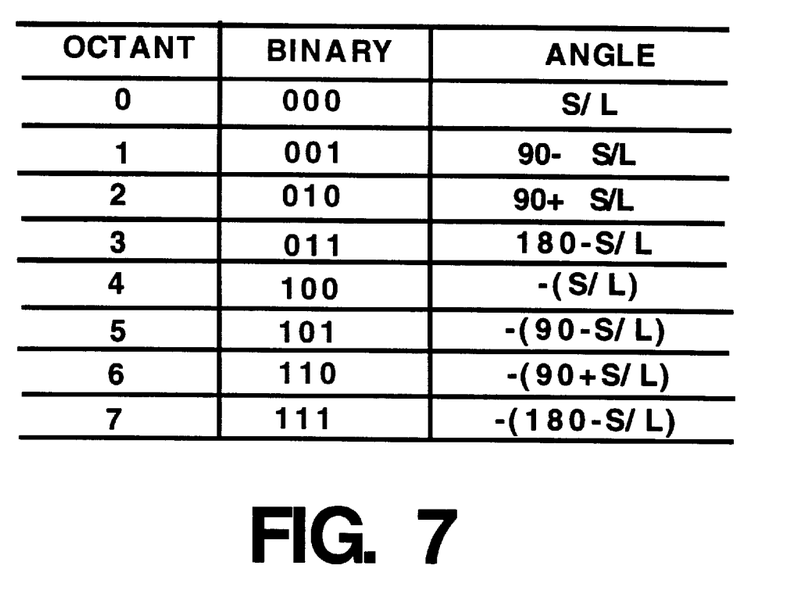
FIG. 7 is a table illustrating operation of the rectangular to polar coordinate converter of FIG. 4.

The "sector mask" 504 (outlined in phantom) comprises a two input AND gate 506 which receives the two least significant bits ("1" and "0") of the octant signal S7. The complete octant code is shown in FIG. 7.

This code identifies the sectors shown in FIG. 6 and determines the arithmetic processing used in the polar converter 30 for converting the quadrature samples X and Y into polar coordinates R and $\phi$. As seen from the code table, to cover a sector of 180 degrees plus or minus 45 degrees, one needs only to inhibit the counter 500 during two octants, namely octant 3 and octant 7. As is apparent from the three bit binary code table, the least significant two bits of octants 3 and 7 are both logic "ones". Thus by ANDing the least significant bits of the octant code, the gate 506 will be enabled any time the octant code is either "3" (011 in binary) or "7" (111 in binary). The output of gate 506 is therefore connected to an inhibit input of the gate 502 whereby counting is inhibited whenever the burst phase angle is in the "excluded" sector (octants 3 or 7).

FIG. 3 is a detailed logic diagram of a suitable implementation of the burst accumulator (or quadrature phase detector) 22 of FIG. 1. Reviewing briefly, the function of the accumulator is to sample burst at four times the color subcarrier frequency (4Fsc) thus producing one sample for each 90 degrees of the burst signal. When the loop is locked, the even samples occur at the peaks of the burst thus forming the "in-phase" or "X" samples and the odd samples occur at axis crossings of burst to form the "quadrature phase" or "Y" samples. Taken together, these two values, X and Y represent the burst vector in a rectangular coordinate system. The function of the accumulator 22 is to perform the necessary arithmetic operations for properly sorting and totaling the samples including removal of the direct current (DC) component or "pedestal" value (e.g., around black level) from the burst samples produced by the A/D converter 20.

In more detail, the video signal samples produced by A/D converter 20 are in the form of unsigned binary. Since burst appears during the trailing portion of horizontal sync, it will have a DC or pedestal value around black level. The exact value may be unknown or may vary with the signal source. To remove this component from the burst measurements, the video signal S2 from A/D converter 20 is first converted from unsigned binary to a two's complement form by inverting the most significant bit (MSB) by means of an inverter 300. This change in arithmetic form facilitates addition and subtraction of samples in the accumulator.

The two's complement samples from the inverter 300 are next applied to an adder/subtractor 302 comprising an exclusive OR gate 304 and a full adder 306. Selection of addition or subtraction modes is controlled by a clock signal Fsc at the color subcarrier rate which is one fourth of the 4-Fsc clock rate of the VCO 26. The adder/subtractor output is stored in two series connected latches 312 and 314 and fed back to the adder addend input. By clocking the latches at the 4 Fsc sample rate and changing from addition to subtraction every two sample periods using the Fsc clock, the in-phase samples "X" will be accumulated in latch 312 and the quadrature phase samples "Y" will be accumulated in latch 314. Since the adder/subtractor alternates between addition and subtraction every two sample periods of the 4 Fsc clock, the "X" samples are alternately added and subtracted to produce the accumulated "X" value in latch 312. It is the alternate addition and subtraction of the X value samples (e.g., +X0, −X2, +X4, −X6, +X8, −X10 etc.) which results in cancellation of the DC component of X. The burst component of X does not cancel because the burst "sign" or polarity alternates every two samples and so the burst samples add. Accordingly, the burst samples accumulate and the DC component or pedestal portion of the samples simply cancel. The same result occurs for the Y samples.

To confine the X and Y samples to burst only, the output of adder 306 (a 13 bit sum) is applied to the accumulator latch 312 via a burst gate 310 which is enabled for 48 of the 4-Fsc clock periods during the burst interval of each line. A typical burst (NTSC) will have 8 complete cycles corresponding to 32 samples of the 4-Fsc clock. The burst gate is intentionally made substantially wider than the burst width to ensure capture of all the burst cycles in the event of substantial timing errors in the video source.

At the end of the burst gating period (48 samples of the 4-Fsc clock) a burst gate closed signal (provided by timing unit 24) is applied to latches 316 and 318 which store the accumulated burst vector data X and Y for the remainder of the line during which time the data is converted to polar form, passed through limiter 50 and the noise estimate is made by counting the number of times the limiter limit is exceeded as previously explained.

Figure 4:
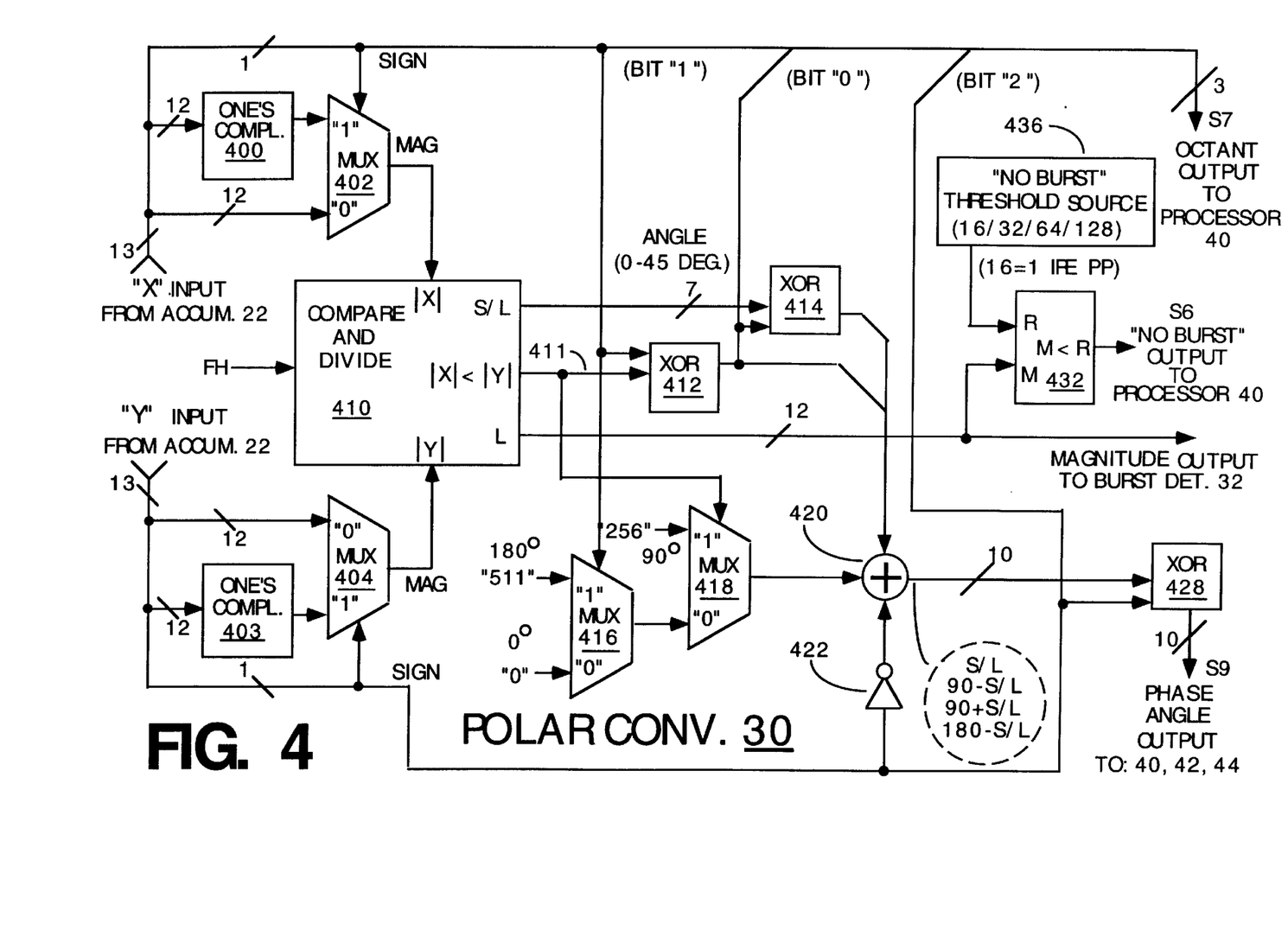
FIG. 4 is a detailed block diagram of a rectangular to polar coordinate converter suitable for use in the apparatus of FIG. 1.

FIG. 4 is a detailed logic diagram illustrating the polar converter 30 which provides the functions of: (i) conversion from rectangular to polar coordinate form (magnitude and angle) for the burst vector, (ii) identification of the specific octant the burst vector is in and (iii) generation of the "NO BURST" signal.

To provide polar conversion, the X and Y coordinates from accumulator 22 are applied to respective inputs of a comparison and division circuit 410 via respective one's complementor circuits each comprising a ones complementor or inverter (400 or 403) and a multiplex switch (402 or 404) controlled by the sign bit of the input signal. This converts the coordinates from two's complement to unsigned binary for ease of subsequent magnitude comparisons and division. For example, when the sign of X is "0" (bit 13, indicating a positive number), the remaining 12 bits of the magnitude of X are passed directly to the X input of circuit 410 via mux 402. If, however, the sign of X is negative (binary "1", indicating a negative number), then mux switch 402 couples the complemented 12 magnitude bits to the X input of circuit 410 thus converting X to unsigned binary form. The magnitude bits (e.g., 1–12) of the Y input signal are similarly converted to unsigned form under control of the Y sign bit (bit 13) for application to the Y input of the comparison and division circuit 410. Internally, the compare and divide circuit 410 includes a magnitude comparator for identifying the larger of X and Y and outputs this value as signal "L" (i.e., "larger"). The signal "L" is used to represent the "MAGNITUDE" of the polar burst vector S12 for application to the burst detector 30.

The polar magnitude signal "L" is also applied to a short time constant NO-BURST detector comprising a comparator 432 which compares signal "L" with a reference level signal provided by a NO BURST threshold source 436. For purposes of overall system adjustment, the threshold source 436 is programmable to provide a number of reference values. Illustratively, burst reference values of 16, 32, 64 and 128 are available. In terms of IRE signal levels, these correspond to burst amplitudes of 1, 2, 4 and 8 IRE levels. The comparator compares signal "L", (which is the "larger" of the vector components X and Y), with the burst reference level provided by source 436 and outputs the NO-BURST signal S6 when the magnitude signal "L" is less than the burst reference signal R. As previously noted, the time constant of this burst detector is relatively short in that detection occurs on a line by line basis as compared with the long time constant burst detector 32 which has a field rate time constant for detecting monochrome video signals. The NO-BURST signal S6, as previously noted, inhibits the calculation of the video noise level for lines with burst missing such as the lines of vertical sync and lines with burst drop outs.

Identification of specific octants of the burst vector is provided by a three bit octant identifications signal S7. The most significant bit comprises the sign bit of the "Y" input signal. The second most significant bit B1 comprises the sign bit of the "X" input signal. The lease significant bit LSB comprises the exclusive OR of the sign bit of the "X" input signal with the output of the X<Y magnitude comparator in circuit 410.

FIG. 7, as previously noted, identifies the octants 0–7 in terms of this three bit code. Reviewing briefly, the lower two bits of the octant code are AND'ed in sector mask 504 to exclude bursts from the noise calculation near 180 degrees (+/−45 degrees) to prevent errors from video material from anti-copy protected tapes of the type in which burst is periodically inverted.

Considering now the details of the polar conversion function of converter 30, this conversion is based on an approximation that for small angles (e.g., below 45 degrees) the arctangent of the angle defined by the rectangular coordinates X and Y is approximately equal to the smaller of X and Y divided by the larger of X and Y. Circuit 410 includes a magnitude detector, as previously explained, which determines the relative sizes of X and Y. This detector is used internally to perform a division of the smaller of the larger signal (signified as "S/L") and this number is used to represent the 7 least significant bits of the polar angle which cover a range of 45 degrees. To cover a full circle (360 degrees) the converter 30 adds or subtracts angles of 0, 90, or 180 degrees depending upon the octant the burst vector is in. The octants are determined as described above and the arithmetic of deriving the full value for each octant is shown in FIG. 7.

In more detail, the arithmetic calculations of FIG. 7 for the burst vector angle are performed in converter 30 by a full adder 420 which by means of exclusive OR gate 414 and inverter 422 is capable of either addition or subtraction. Two multiplex switches are provided 416 and 418 which provide the numerical equivalent of fixed angles of 0, 90 and 180 degrees to one input of the adder 420. By selecting the appropriate fixed angle, and arithmetically combining (e.g., adding or subtracting) it with the arctangent approximation of the burst angle (the signal S/L), any burst angle in octants 0–3 can be represented. The remaining octants 4–7 are calculated by inverting the corresponding one of the octants 0–3. This is done by the exclusive OR gate 428 connected to the output of adder 420.

As an example of calculation of the burst angle, assume that the vectors X and Y are both positive and X is larger than Y. This defines a burst vector in octant "0" which lies between zero and forty five degrees and whose angular value is approximately equal to Y/X (the smaller divided by the larger). Since X is positive, the multiplex switch 416 will select the constant "zero" as an output which corresponds to zero angular degrees. Since it is assumed that X is larger than Y the comparator signal X<Y will also be zero thus causing multiplex switch 418 to select the output of switch 416 which is zero degrees, as previously noted. Adder 420, for this condition adds a constant of zero (from switches 416 and 418) to the arctangent approximation (S/L) from compare and divide circuit 410 and since the sign of Y is zero (Y is positive) the output exclusive OR gate 428 will pass this value (+S/L) as the burst phase angle S9.

For different octants adder 420 adds different constants to S/L as shown in the inset dashed circle at the adder output and shown also in the table of FIG. 7. For example, for a burst vector lying in octant 1, the complete vector angle is the value of S/L subtracted from the 90 degree reference provided by switch 416. In octant 2 the 90 degree value is added to the S/L value and in octant 3 the burst vector is determined by subtracting the S/L value from 180 degrees. For the remaining octants 4–7, the value of the burst vector is found exactly as for the corresponding octants 0–3 except that the output of the adder 420 is inverted by exclusive OR gate 428 thus reversing the sign of the indicated burst phase angle.

FIG. 5 is a detailed logic diagram of the limiter 50. This unit converts the burst vector error signal (i.e., the phase plus frequency signal S17) into sign and magnitude format and provides dual mode limiting action. It limits the error signal magnitude to "7" when the system is locked and to a level of "127" when the system is unlocked. The binary values of 7 and 127 correspond, in terms of burst angular degrees to about 3.5 degrees and 63 degrees, respectively. Advantageously, providing a wider limiting angle before limiting is reached for the unlocked condition provides further enhancement in lock acquisition speed in addition to the speed enhancement provided by the frequency term (S10) that is added to the phase term (S9) by adder 40 when the loop is in the unlocked condition.

In more detail, in limiter 50 the phase plus frequency signal S17 from adder 40 is converted from two's complement form to unsigned binary by means of a ones' complementor 502 and a multiplex switch 504. The switch 504 is controlled by the sign bit of the input signal to select the 14 magnitude bits as an output (S50) when the sign bit is zero (indicating a positive number) and to select the output of the ones complementor 502 when the sign bit is "1" (signifying a negative number) thus producing an unsigned binary output signal S50. The sign bit of the input signal (bit 15) is also stored in a latch 510 so as to provide the sign bit signal S11 for use by the binary rate multiplier in determining the polarity of output current (current sourceing or current sinking) to the loop filter.

The unsigned binary phase angle signal S50 is applied to a comparator 508 which a multiplex switch 512 to select the seven least significant bits of signal S50 (provided by a truncator 605) when signal S50 is greater than a value of "127", otherwise, switch 512 selects a constant "high limit" value of "127" as the output. This portion of the circuit thus provides a first level of limiting of the burst phase angle signal to a level of "127". If, for example, the burst phase angle is any value less than 127, then comparator 508 will select the truncated signal S54 as the output signal S56 of switch 512. Conversely, any value of burst angle greater than 127 will cause switch 512 to select the reference value of "127" as the output signal S56.

A second stage of limiting of the signal S56 is provided by a comparator 514, an inhibit AND gate 516 and a second multiplex switch 518. Specifically, comparator 514 compares the burst angle signal S56 with a reference level of "7" and provides a high output if signal S56 is greater than the value of 7. (Note, binary "7" corresponds to an angle of about 3.5 degrees). The gate 516 receives the output of comparator 514 and is enabled by lock detector 44 when the lock detector output is low signifying a "locked" condition of the loop. If the input signal S56 is less than a value of "7", and the loop is locked, then switch 518 will select the signal S56 as the burst phase angle. If the input signal is greater than 7, and the loop is locked, gate 516 will cause switch 518 to select a fixed limiting value of "7" as an output thus limiting the burst phase angle to about 3.5 degrees when the loop is locked.

Since the burst magnitude signal S58 is unsigned, the limiting angle may be plus or minus 3.5 degrees since the burst phase may be leading or lagging the reference phase (note that the reference phase is the output of the VCO 26 divided by 4 which is the color subcarrier frequency Fsc). However, if the loop is unlocked, gate 516 will cause switch 518 to select the signal S56 (which has a limiting level of 127) as the output burst vector angle. A latch 520 is provided for storing the burst vector angle signal S12.

Reviewing briefly, the gate 516 provides the "limiting" output signal S15 for processor 40. This signal will be high if the loop is locked and the burst angle is greater than the reference value of "7" which corresponds to a burst phase angle of about 3.5 degrees. The "limiting" signal will be low if the loop is not locked or if the burst phase angle error is below the limiting value of "7" which corresponds approximately, to a burst phase error of 3.5 degrees. Processor 40, as previously explained, tallies the number of times limiting has taken place when the loop is locked for developing the video noise level indicating signal (B0,B1).

What is claimed:

1. Apparatus comprising:
    means for measuring a phase angle of a burst component of a color video signal relative to a reference signal supplied thereto; and
    means for generating a count of phase angle measurements which fall within a given range of values during a given time interval, and for generating a noise indicating signal in response to said count.

2. Apparatus as recited in claim 1, further comprising:
    an inhibitor circuit for excluding phase angle measurements from said count which lie in a second range of angles.

3. The apparatus of claim 2 wherein the second range of angles comprises angles disposed about an angle of 180 degrees.

4. Apparatus as recited in claim 1, wherein the means for measuring comprises:
    quadrature detector means for applying the burst component and the reference signal to respective quadrature phase detectors for developing in-phase and quadrature-phase output signals, X and Y, respectively; and
    rectangular to polar converting means for converting said in-phase and quadrature-phase output signals, X and Y, to a phase angle indicating signal for application to said output circuit for deriving said noise indicating signal.

5. Apparatus as recited in claim 4, wherein the quadrature detector comprises:
    sampling means for generating samples of said burst component at four times the frequency of said reference signal;
    an accumulator for sorting said samples to provide two quadrature related groups of samples.

6. Apparatus as recited in claim 1, further comprising:
    a pair of sensing circuits for sensing the absence of bursts on a line by line and on a field by field basis, respectively; and
    an inhibiting circuit responsive to said sensing circuits for inhibiting angle measurements upon the absence of bursts.

7. Apparatus as recited in claim 1, further comprising:
    an inhibiting circuit for excluding phase angle measurements which fall within selected octants from the derivation of said noise indicating signal.

8. Apparatus as recited in claim 1, further comprising:

means for inhibiting said measurements for phase angles near zero degrees;

means for inhibiting said measurements for phase angles near 180 degrees;

means for inhibiting said measurements for missing ones of said burst components; and means for identifying monochrome intervals of said video signal and for inhibiting said measurements during said monochrome intervals.

9. A phase locked loop comprising:

an oscillator for generating an oscillatory signal;

means for sampling said input signal at instants determined by said oscillatory signal for providing samples of said periodic component of said input signal;

means responsive to said samples for generating a phase error signal for phase locking said oscillatory signal of said oscillator to said periodic component of said input signal; and means for deriving a noise indicator signal from said phase error signal; said deriving means comprising:
- a detector for detecting values of said phase error signal which exceed a given phase angle; and
- a counter for counting the number of detected error values occurring within a given time interval.

10. A phase locked loop, as recited in claim 9, wherein said detector detects values of said phase error signal which are greater than a minimum phase angle and are less than a maximum phase angle; and said counter counts the number of detected error values occurring within a period of at least one video field.

11. A phase locked loop system, comprising:

a n oscillator for generating an oscillatory signal;

a phase detector responsive to said periodic component of said input signal and to said oscillatory signal for generating a phase error signal for phase locking said oscillatory signal of said oscillator to said periodic component of said input signal;

means for deriving a phase noise indicator signal from said phase error signal; and means for inhibiting said deriving means for phase angles within a predetermined range of phase angles.

12. The apparatus of claim 11 wherein the predetermined range of phase angles comprises phase angles near zero degrees and near 180 degrees.

13. A method for generating a noise indicating signal comprising the steps of:

measuring a phase angle of a burst component of a color video signal relative to a reference signal;

generating a count of phase angle measurements which fall within a given range of values during a given time interval; and providing the noise indicating signal in response to the count.

14. The method of claim 13 further comprising the step of excluding from the count the phase angle measurements occurring during a predetermined condition.

15. The method of claim 14 wherein the predetermined condition comprises the phase angle being near 180 degrees, or the phase angle being near zero degrees, or the phase angle measurement occurring during a portion of the color video signal lacking the burst component.

* * * * *